United States Patent
Chiang et al.

(10) Patent No.: US 9,720,115 B2
(45) Date of Patent: Aug. 1, 2017

(54) METHOD OF MULTI-TRIGGERING

(71) Applicant: National Applied Research Laboratories, Taipei (TW)

(72) Inventors: Hung-Wei Chiang, Tainan (TW);
Pei-Yang Lin, Taipei (TW);
Kung-Chun Lu, Hsinchu (TW);
Shieh-Kung Huang, Taoyuan (TW);
Ting-Yu Hsu, New Taipei (TW)

(73) Assignee: National Applied Research Laboratories, Taipei (TW)

( * ) Notice: Subject to any disclaimer, the term of this patent is extended or adjusted under 35 U.S.C. 154(b) by 164 days.

(21) Appl. No.: 14/857,834

(22) Filed: Sep. 18, 2015

(65) Prior Publication Data

US 2016/0187505 A1 Jun. 30, 2016

(30) Foreign Application Priority Data

Dec. 24, 2014 (TW) .............................. 103145243 A

(51) Int. Cl.
*G01V 1/16* (2006.01)
*G01V 1/00* (2006.01)

(52) U.S. Cl.
CPC .............. *G01V 1/008* (2013.01); *G01V 1/168* (2013.01)

(58) Field of Classification Search
CPC ......... G01V 1/008; G01V 1/288; G01V 1/168

USPC ............................... 367/14; 340/690; 73/649
See application file for complete search history.

(56) References Cited

U.S. PATENT DOCUMENTS

| 7,463,162 B1* | 12/2008 | Hosseini | G01V 1/008 340/539.26 |
| 2009/0180099 A1* | 7/2009 | Kurokawa | G01C 3/06 356/4.01 |
| 2011/0255371 A1* | 10/2011 | Jing | G01V 1/28 367/73 |
| 2013/0258816 A1* | 10/2013 | Sun | G01V 1/166 367/188 |

FOREIGN PATENT DOCUMENTS

| CN | 101377549 A | 3/2009 |
| CN | 102112894 A | 6/2011 |
| CN | 102985850 A | 3/2013 |
| TW | 201250253 | 12/2012 |
| TW | 201310053 | 3/2013 |

* cited by examiner

*Primary Examiner* — Ian J Lobo
(74) *Attorney, Agent, or Firm* — Winston Hsu

(57) ABSTRACT

A method of multi-triggering includes calculating a specific distance according to a plurality of parameters, deploying a plurality of earthquake detectors used for detecting a vertical acceleration of a surface vibration of the earth, and determining whether an earthquake happens or not according to the plurality of earthquake detectors.

10 Claims, 5 Drawing Sheets

METHOD OF MULTI-TRIGGERING

BACKGROUND OF THE INVENTION

1. Field of the Invention

The present invention relates to a method of multi-triggering, and more particularly, to a method of multi-triggering through deploying a plurality of earthquake detectors.

2. Description of the Prior Art

In all nature disasters, "earthquake" is a disaster which is quite terrible, since earthquake is not predictable like other disasters such as hurricane, volcanic eruption, etc.

Earthquake waves are classified, according to velocities thereof from high to low, as P waves, S waves, surface waves, etc. The surface waves have the greatest amplitudes of the earthquake waves, and the S waves have the second greatest amplitudes. These two kinds of earthquake waves are more destructive. The P waves have faster propagation velocities. Earthquake warning is an action of utilizing earthquake detectors to detect earthquake and providing pre-warning before the earthquake causing damages.

However, earthquake detectors are usually false triggered due to earth surface vibrations caused by human factors (e.g., people running, vehicle passing). Therefore, how to avoid human factors triggering the earthquake detectors is a significant objective in the field.

SUMMARY OF THE INVENTION

It is therefore a primary objective of the present invention to provide a method of multi-triggering, to avoid false triggering of the earthquake detectors caused by human factors.

The present invention discloses a method of multi-triggering, comprising calculating a specific distance according to a plurality of parameters; deploying a plurality of earthquake detectors according to the specific distance, wherein the plurality of earthquake detectors are utilized for detecting a vertical acceleration of an earth surface vibration; and determining whether an earthquake occurs according to the plurality of earthquake detectors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
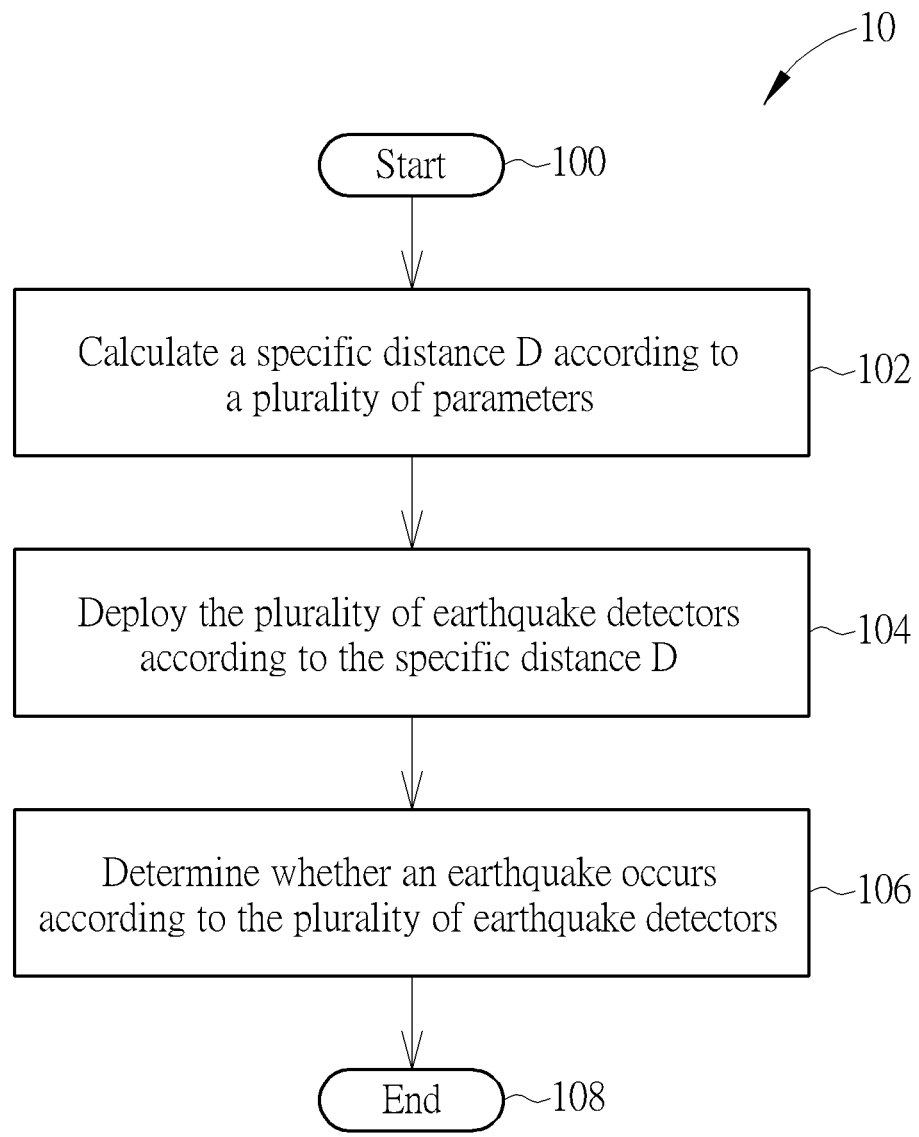
FIG. 1 is a schematic diagram of a multi-triggering process according to an embodiment of the invention.

Please refer to FIG. 1, which is a schematic diagram of a multi-triggering process 10 according to an embodiment of the invention. The multi-triggering process 10 may be applied in an earthquake warning broadcast system, so as to prevent false triggering due to human factors. The earthquake warning broadcast system may comprise a plurality of earthquake detectors. The multi-triggering process 10 comprises the following steps.

Step 100: Start.

Step 102: Calculate a specific distance D according to a plurality of parameters.

Step 104: Deploy the plurality of earthquake detectors according to the specific distance D.

Step 106: Determine whether an earthquake occurs according to the plurality of earthquake detectors.

Step 108: End.

According to the multi-triggering process 10, the plurality of parameters comprise a sampling frequency of an earthquake detecting system and a propagation velocity of an earthquake wave, and not limited herein. Deploying the plurality of earthquake detectors is determined according to the specific distance D. The specific distance D is computed according to the sampling frequency of the earthquake detecting system and the propagation velocity of the earthquake wave. When an earthquake occurs, according to characteristics of the earthquake wave, vertical accelerations of earth surface vibrations within the specific distance D should be substantially the same. Therefore, the plurality of earthquake detectors would detect a vertical acceleration (i.e., an acceleration along the z-axis direction) of the earth surface vibration within the specific distance D, to determine whether an earthquake occurs. In comparison to the prior art, the multi-triggering process 10 of the present invention utilizes the plurality of earthquake detectors within the specific distance D to reduce a probability of false determining the earth surface vibrations caused by human factors as an earthquake. In addition, the plurality of earthquake detectors may be deployed under an outdoor ground (e.g., a road) or within an indoor environment within a structure. When the earthquake detector is deployed under the road, the earthquake detector may be disturbed by vibration caused by vehicles. Meanwhile, when the earthquake detector is deployed the indoor environment within the structure, the earthquake detector may be disturbed by human activities. Notably, only an actual happened earthquake simultaneously triggers the earthquake detectors deployed under the outdoor ground and the earthquake detector deployed in the indoor environment. Therefore, in the present invention, an occurrence earthquake is determined according to the plurality of earthquake detectors deployed at different locations, so as to enhance an accuracy of earthquake detection.

Figure 2:
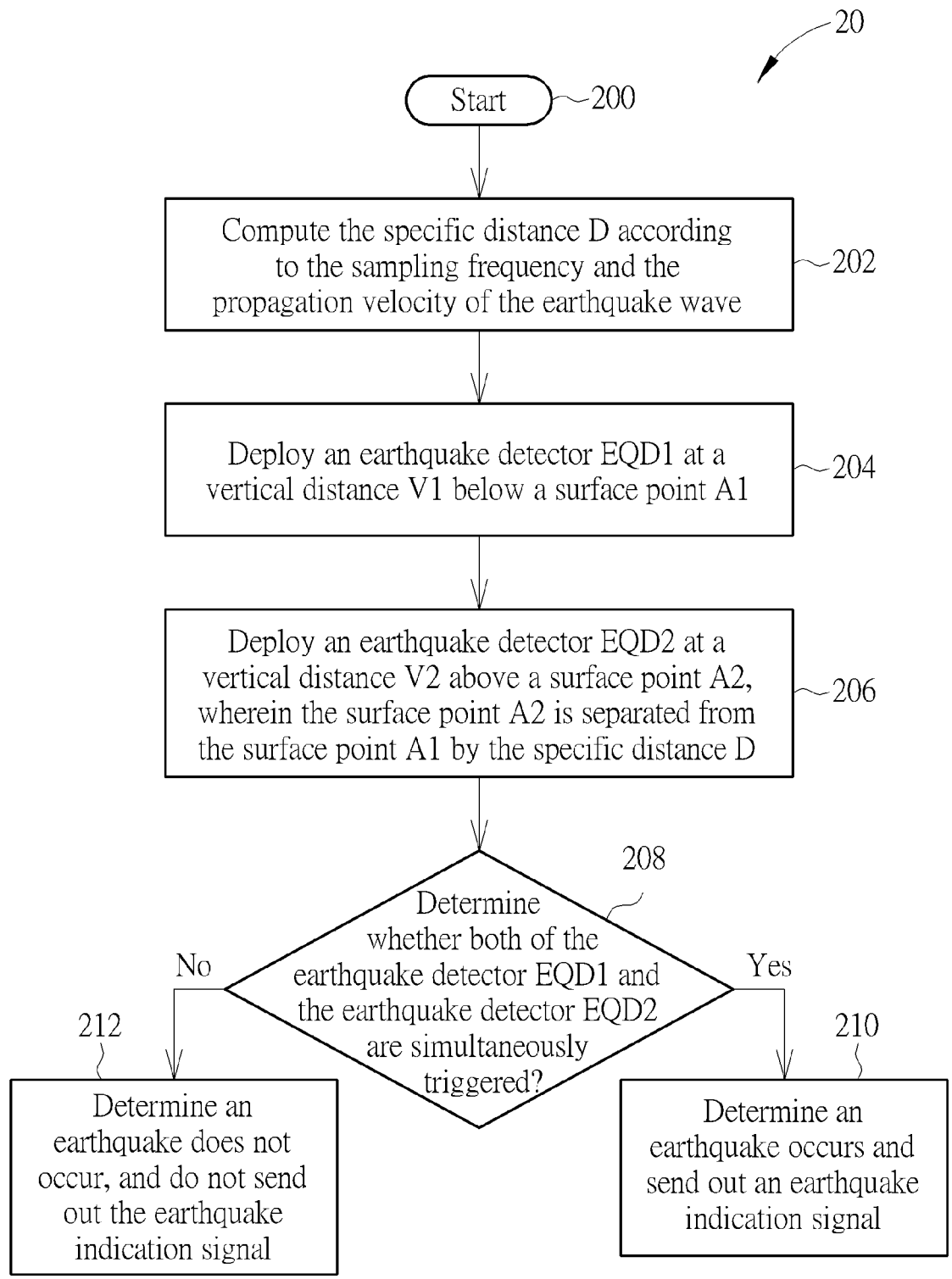
FIG. 2 is a schematic diagram of a multi-triggering process according to an embodiment of the invention.

Furthermore, for details of deploying the plurality of the earthquake detectors, please refer to FIG. 2. As shown in FIG. 2, the multi-triggering process 20 comprises the following steps.

Step 200: Start.

Step 202: Compute the specific distance D according to the sampling frequency and the propagation velocity of the earthquake wave.

Step 204: Deploy an earthquake detector EQD1 at a vertical distance V1 below a surface point A1.

Step 206: Deploy an earthquake detector EQD2 at a vertical distance V2 above a surface point A2, wherein the surface point A2 is separated from the surface point A1 by the specific distance D.

Step 208: Determine whether both of the earthquake detector EQD1 and the earthquake detector EQD2 are simultaneously triggered? If yes, go to Step 210; otherwise, go to Step 212.

Step 210: Determine an earthquake occurs and send out an earthquake indication signal.

Step 212: Determine an earthquake does not occur, and do not send out the earthquake indication signal.

According to the multi-triggering process 20, the earthquake detector EQD2 is deployed at the vertical distance V2 above the surface point A2 separated from the surface point A1 by the specific distance D. For example, the earthquake detector EQD2 may be deployed at a ceiling or a beam of a roof in the structure, to prevent disturbance caused by human activities. In other words, a horizontal distance between the earthquake detector EQD2 and the earthquake detector EQD1 is the specific distance D. Preferably, the specific distance D is substantially 100 meters, and the vertical distance V1 is substantially 2 meters. When an earthquake occurs, vertical accelerations detected by the earthquake detector EQD2 and the earthquake detector EQD1, which are the specific distance D apart, should be substantially the same. If the earthquake detector EQD1 and the earthquake detector EQD2 are simultaneously triggered, it represents that an earthquake occurs, and an earthquake indication signal is sent to the earthquake warning broadcast system. If the earthquake detector EQD1 and the earthquake detector EQD2 are not simultaneously triggered (i.e., only one of the earthquake detectors is triggered), which represents that the earth surface vibration may be caused by human factors, then no earthquake is determined and no earthquake indication signal is sent to the earthquake warning broadcast system. Therefore, the multi-triggering process 20 may reduce the probability of false determining the earth surface vibrations caused by human factors as real earthquake.

Furthermore, even though the vertical accelerations detected by the earthquake detector EQD2 and the earthquake detector EQD1, which are the specific distance D apart, are substantially the same, there is a subtle difference in between because of the distance. Therefore, the multi-triggering process 20 of the present invention may further comprises a step: configuring a triggering threshold Th1 of the earthquake detector EQD1 and a triggering threshold Th2 of the earthquake detector EQD2, so as to fine tune triggering levels of the earthquake detector EQD1 and the earthquake detector EQD2. In other words, when the vertical acceleration of the earth surface vibration detected by the earthquake detector EQD1 is greater than the triggering threshold Th1, the earthquake detector EQD1 is triggered. Meanwhile, when the vertical acceleration of the earth surface vibration detected by the earthquake detector EQD2 is greater than the triggering threshold Th2, the earthquake detector EQD2 is triggered. The earthquake detector EQD1 and the earthquake detector EQD2 being simultaneously triggered represents an earthquake occurs.

Figure 3:
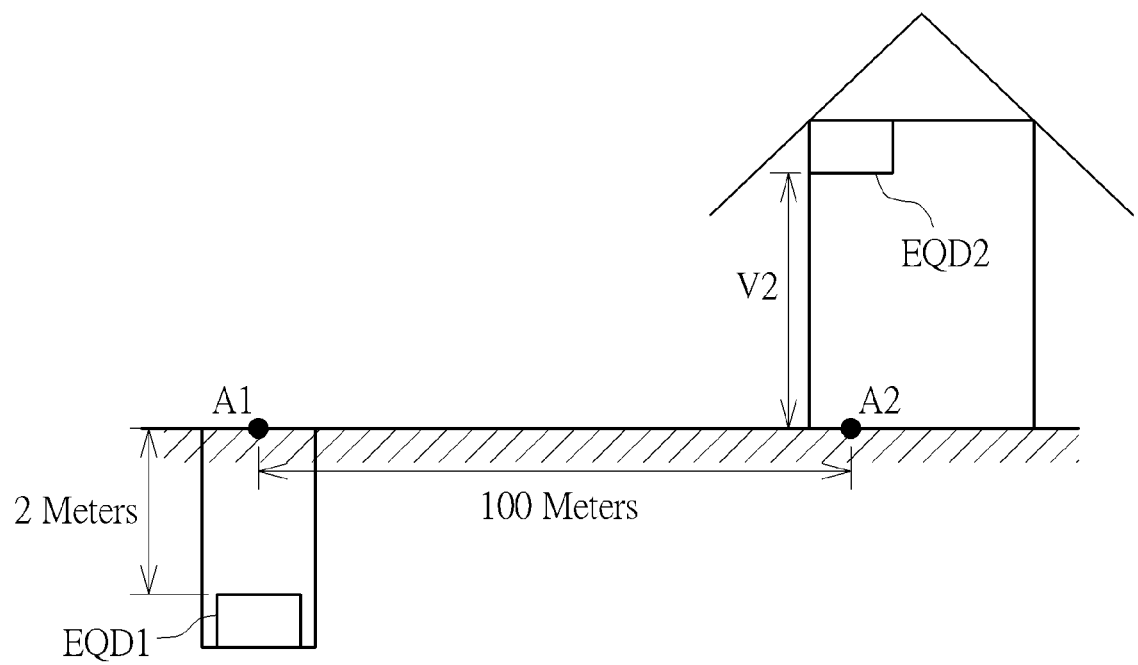
FIG. 3 is a schematic diagram of deploying a plurality of earthquake detectors according to an embodiment of the invention.

Please refer to FIG. 3, which is a schematic diagram of deploying the earthquake detector EQD1 and the earthquake detector EQD2 in the multi-triggering process 20. As shown in FIG. 3, the earthquake detector EQD1 is deployed at 2 meters below the surface point A1, and the earthquake detector EQD2 is deployed at the vertical distance V2 above the surface point A2. The surface point A1 and the surface point A2 are separated by 100 meters.

Figure 4:
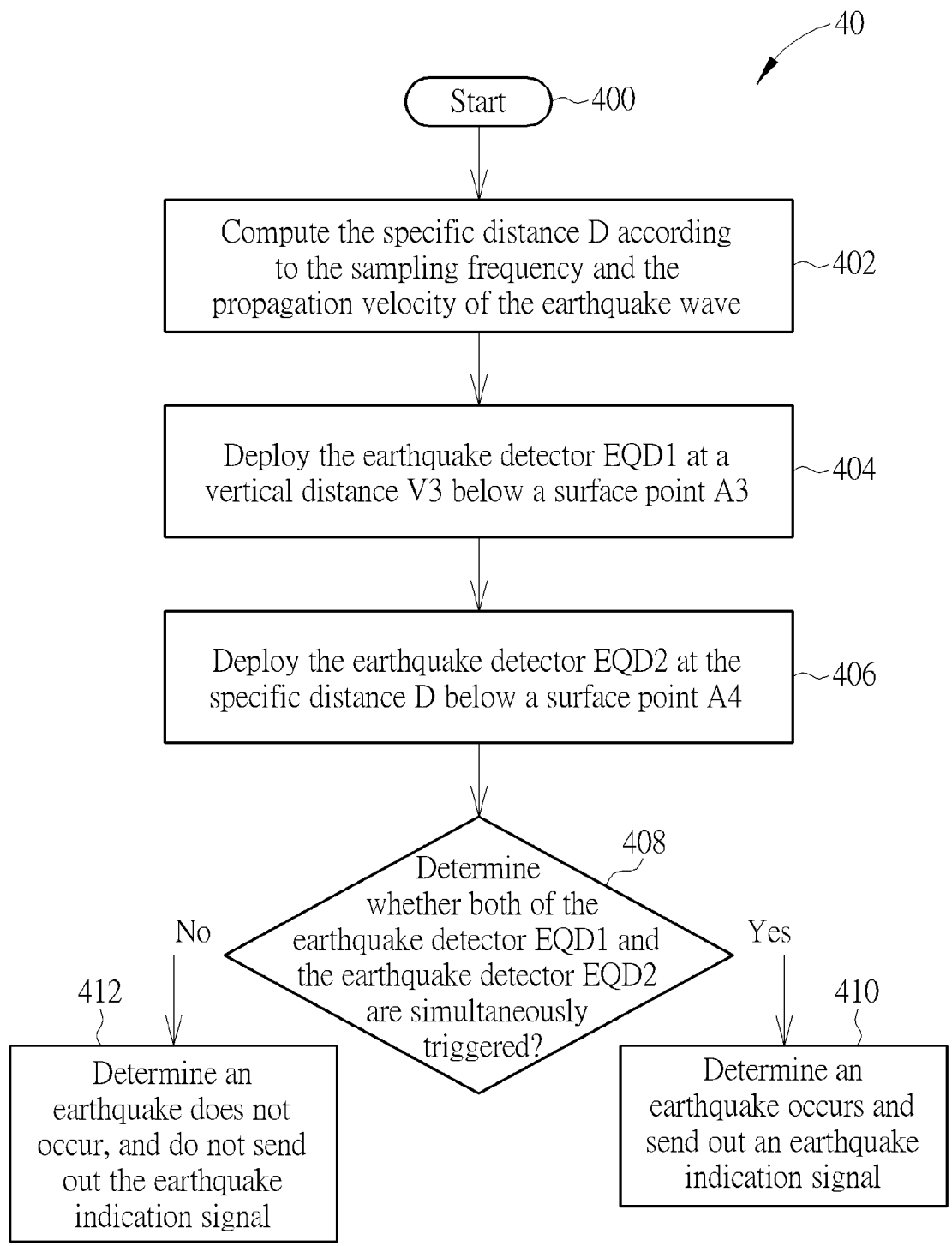
FIG. 4 is a schematic diagram of a multi-triggering process according to an embodiment of the invention.

In addition to the method of deploying the earthquake detector EQD1 and the earthquake detector EQD2 described in the above, there is another method of deploying the earthquake detector, please refer to FIG. 4. As shown in FIG. 4, the multi-triggering process 40 comprises the following steps:

Step 400: Start.

Step 402: Compute the specific distance D according to the sampling frequency and the propagation velocity of the earthquake wave.

Step 404: Deploy the earthquake detector EQD1 at a vertical distance V3 below a surface point A3.

Step 406: Deploy the earthquake detector EQD2 at the specific distance D below a surface point A4.

Step 408: Determine whether both of the earthquake detector EQD1 and the earthquake detector EQD2 are simultaneously triggered? If yes, go to Step 410; otherwise, go to Step 412.

Step 410: Determine an earthquake occurs and send out an earthquake indication signal.

Step 412: Determine an earthquake does not occur, and do not send out the earthquake indication signal.

According to the multi-triggering process 40, the earthquake detector EQD2 is deployed at the specific distance D below the surface point A4, wherein the specific distance D is much greater than the vertical distance V3. Preferably, the specific distance D is substantially 40-50 meters, and the vertical distance V3 is 2 meters. A horizontal distance between the earthquake detector EQD2 and the earthquake detector EQD1 does not have to be too far. When an earthquake occurs, vertical accelerations detected by the earthquake detector EQD2 and the earthquake detector EQD1, which are the specific distance D apart, should be substantially the same. The multi-triggering process 40 and the multi-triggering process 20 are the same except the method of deploying the earthquake detector EQD2 and the earthquake detector EQD1. Therefore, details of the multi-triggering process 40 may be referred to related paragraphs in the above, which are not narrated herein.

Figure 5:
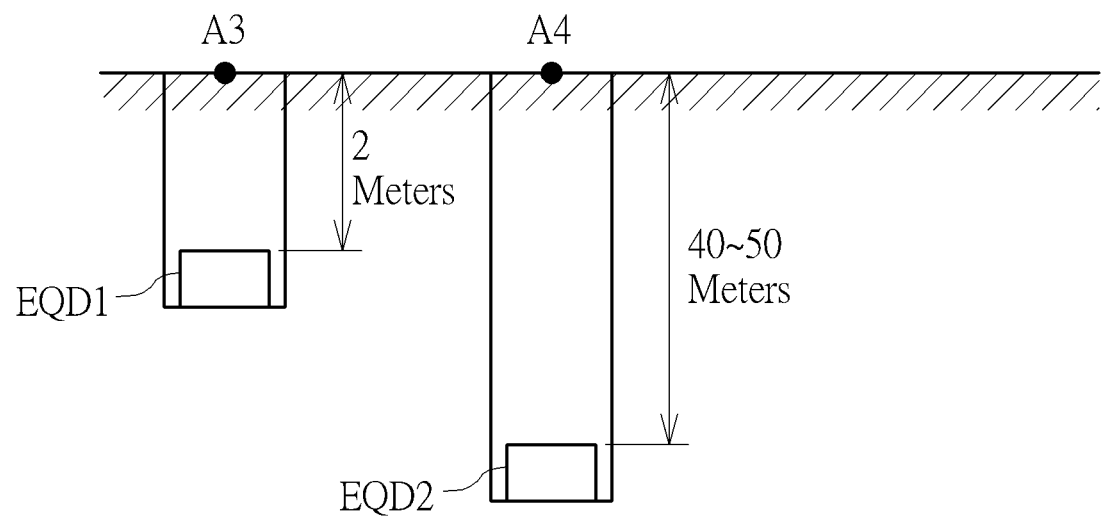
FIG. 5 is a schematic diagram of deploying a plurality of earthquake detectors according to an embodiment of the invention.

Please refer to FIG. 5, which is a schematic diagram of deploying the earthquake detector EQD1 and the earthquake detector EQD2 in the multi-triggering process 40. As shown in FIG. 5, the earthquake detector EQD1 is deployed at 2 meters below the surface point A3, and the earthquake detector EQD2 is deployed at 40-50 meters below the surface point A4.

In summary, the multi-triggering method of the present invention utilizes a plurality of earthquake detectors to detect the vertical acceleration of the earth surface, so as to determine whether an earthquake occurs, and reduces the probability of false determining the earth surface vibrations caused by human factors as real earthquake.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of multi-triggering to determine whether an earthquake occurs, the method comprising:

calculating a specific distance according to a plurality of parameters;

deploying a plurality of earthquake detectors according to the specific distance, wherein the plurality of earthquake detectors are utilized for detecting a vertical acceleration of an earth surface vibration; and determining whether an earthquake occurs according to whether or not the plurality of earthquake detectors are simultaneously triggered.

2. The method of claim 1, wherein the plurality of parameters comprise a sampling frequency of an earthquake detecting system and a propagation velocity of an earthquake wave.

3. The method of claim 1, wherein the step of deploying the plurality of earthquake detectors according to the specific distance comprises:

deploying a first earthquake detector of the plurality of earthquake detectors at a first vertical distance below a first surface point; and deploying a second earthquake detector at a second vertical distance above a second surface point, separated from the first surface point by the specific distance.

4. The method of claim 3, wherein the specific distance is substantially 100 meters, and the first vertical distance is substantially 2 meters.

5. The method of claim 1, wherein the step of deploying the plurality of earthquake detectors according to the specific distance comprises:

deploying a first earthquake detector of the plurality of earthquake detectors at a first vertical distance below a first surface point; and deploying a second earthquake detector at the specific distance below a second surface point.

6. The method of claim 5, wherein the specific distance is substantially 40-50 meters, and the first vertical distance is substantially 2 meters.

7. The method of claim 1, wherein the step of determining whether an earthquake occurs according to the plurality of earthquake detectors comprises:

determining an earthquake occurs and sending an earthquake indication signal when the earth surface vibration triggers all of the plurality of earthquake detectors.

8. The method of claim 1, wherein the step of determining whether an earthquake occurs according to the plurality of earthquake detectors comprises:

determining an earthquake does not occur when the earth surface vibration does not trigger all of the plurality of earthquake detectors.

9. The method of claim 1, further comprising configuring a plurality of triggering thresholds of the plurality of earthquake detectors.

10. The method of claim 9, wherein the plurality of earthquake detectors are triggered when the vertical acceleration of the earth surface vibration is greater than the plurality of triggering thresholds.

* * * * *